Figure 1:
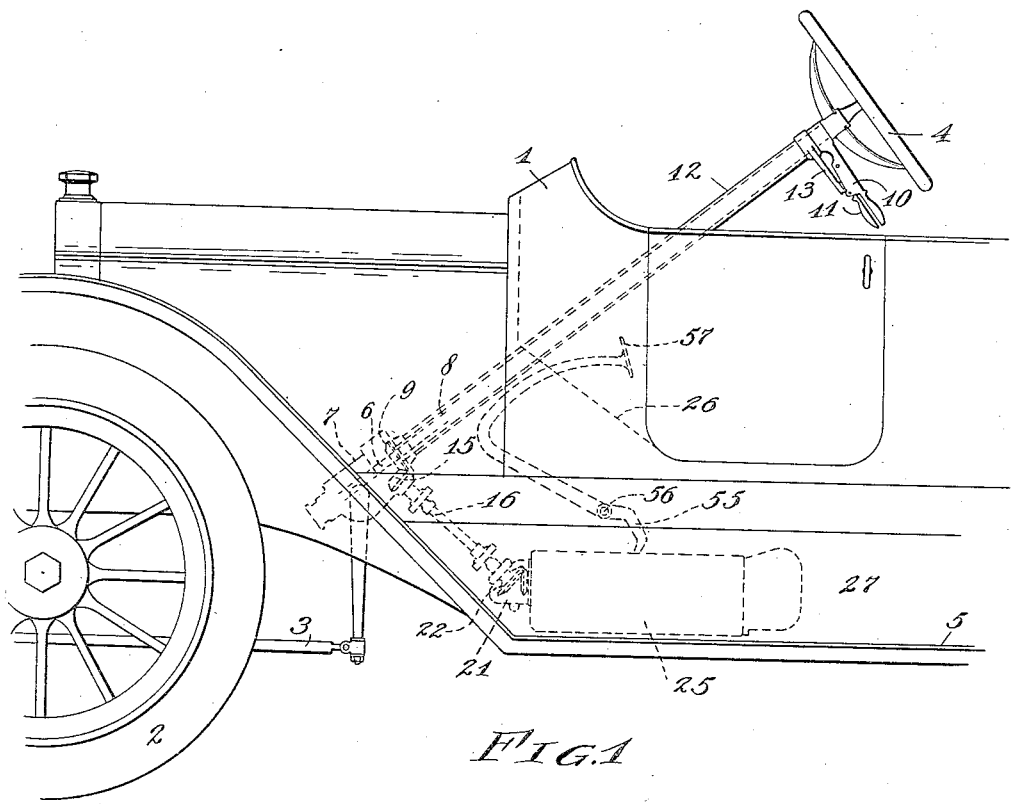

W. C. BAKER.
CONTROLLER OPERATING DEVICE FOR VEHICLES HAVING ELECTRIC TRANSMISSION.
APPLICATION FILED JULY 22, 1912.

1,232,478.

Patented July 10, 1917.
2 SHEETS—SHEET 1.

WITNESSES:

INVENTOR,
Walter C. Baker,
BY
ATTYS.

W. C. BAKER.
CONTROLLER OPERATING DEVICE FOR VEHICLES HAVING ELECTRIC TRANSMISSION.
APPLICATION FILED JULY 22, 1912.

1,232,478.

Patented July 10, 1917.
2 SHEETS—SHEET 2.

WITNESSES:
INVENTOR,
Walter C. Baker,
BY
ATTYS.

UNITED STATES PATENT OFFICE.

WALTER C. BAKER, OF LAKEWOOD, OHIO, ASSIGNOR TO ENTZ MOTOR PATENTS CORPORATION, A CORPORATION OF NEW YORK.

CONTROLLER-OPERATING DEVICE FOR VEHICLES HAVING ELECTRIC TRANSMISSION.

1,232,478.        Specification of Letters Patent.       Patented July 10, 1917.

Application filed July 22, 1912. Serial No. 710,961.

*To all whom it may concern:*

Be it known that I, WALTER C. BAKER, a citizen of the United States, residing at Lakewood, in the county of Cuyahoga and State of Ohio, have invented a certain new and useful Improvement in Controller-Operating Devices for Vehicles Having Electric Transmission, of which the following is a full, clear, and exact description, reference being had to the accompanying drawings.

This invention relates to controllers for electric motors whereby their speed may be governed, and particularly to a mode of operation of such controller which shall be particularly useful in connection with self-propelled vehicles, such as automobiles. Although the electric motor is one of the most flexible power sources known and its operation can be governed with great exactness, no controlling means has ever been employed to my knowledge on automobiles or other vehicles which could be handled with the convenience necessary to take advantage of the great flexibility of the power source. This defect has apparently arisen from the fact that only a single controller-operating means was provided, such means being in some cases operated by the hand of the driver and in other cases by his foot. In a case wherein the controller is operated by the hand its adjustment can be effected with very great accuracy, but with the disadvantage of requiring another operation from hands that are already quite fully occupied. In cases where the controller is operated by the driver's foot, it has been found that, although the operation required a minimum of effort and although the foot may be sufficiently unoccupied to permit this duty easily, the adjustment is less exact than is desirable unless great care and attention be given to the position of the foot. It is the object of this invention to avoid both of these difficulties and to provide a controller governing mechanism which can be operated with an absolute minimum of effort and of personal attention, and which shall combine the accuracy of control of the hand-operated mechanism with the ease of operation of the foot-control device.

Generally speaking this object is attained by the provision of means whereby the displacement of the movable member of the controller shall be limited according to the maximum desired speed of the vehicle through the instrumentality of a manually operated device and in which the operating speed of the motor can be varied as desired below this point by the actuation of suitable pedals, thus permitting the driver to set the hand-operated device to the speed at which he desires to operate the vehicle and thereafter retard or stop the vehicle by foot as may be necessary by the exigencies of traffic, road obstructions, road conditions, or local speed regulations, thereafter regaining the former speed by mere release of such pedal or pedals.

Further objects of the invention relate to the particular construction and arrangement of parts whereby these results may be effected in an efficient and reliable manner and with a minimum of complexity of parts, all of which objects and others not specifically mentioned are attained by means of the construction hereinafter fully described.

Figure 2:
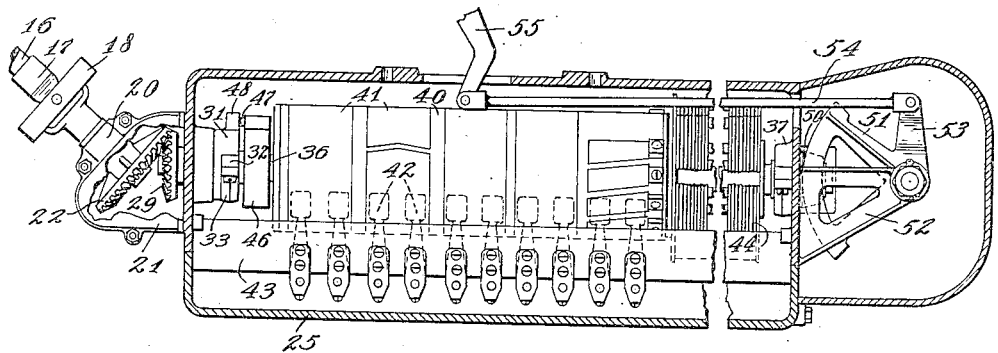
Figure 3:
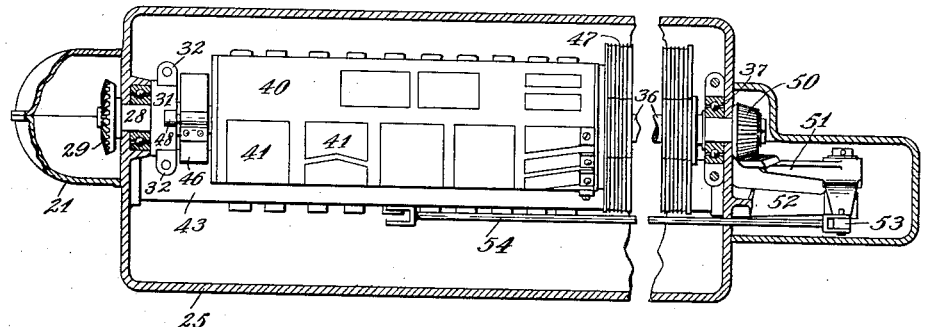
Figure 4:
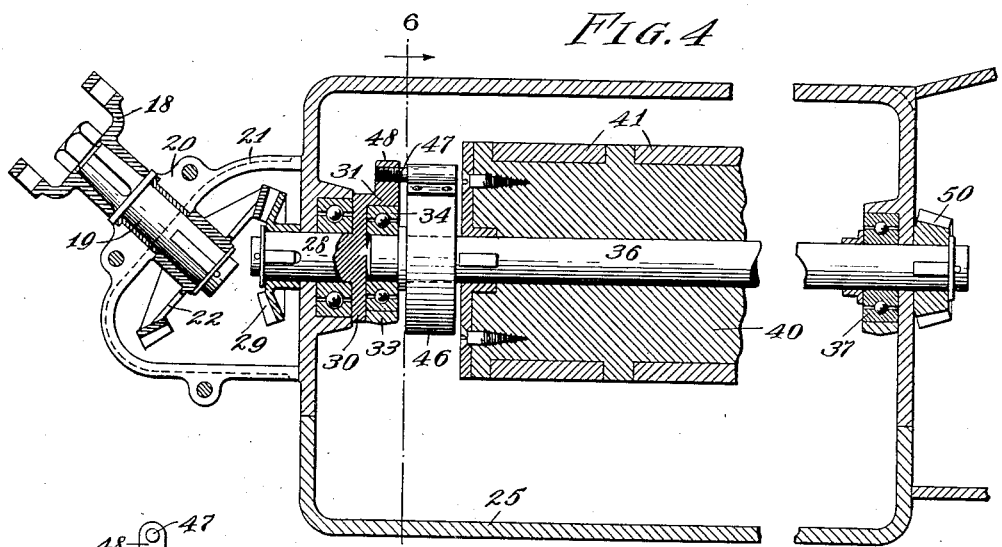
Figure 5:
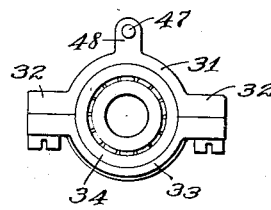
Figure 6:
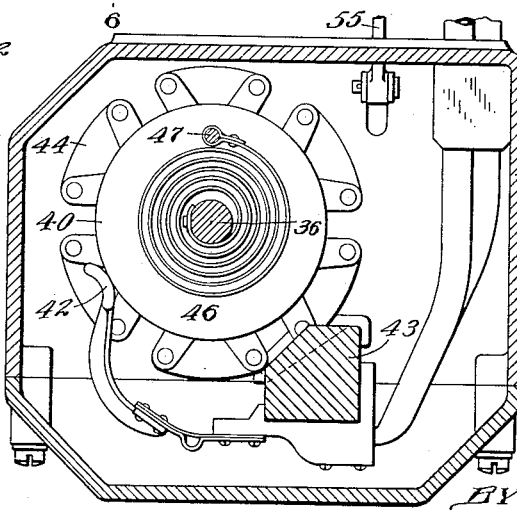

In the drawings accompanying and forming a part of this application I have illustrated one embodiment of means whereby the above described objects are attained, though it will be understood that the construction there disclosed is only one of the many that might be adopted within the scope and spirit of my invention and within the terms of the claims hereto appended. In these drawings, Figure 1 represents in side elevation a portion of an automobile provided with a controller-operating device of my invention, and illustrating the preferred manner of disposing the hand and foot actuated devices; Fig. 2 is a vertical longitudinal cross-sectional view taken through the casing of the controller and illustrating in elevation the controller drum and the drum operating means; Fig. 3 is a cross-sectional view taken through the upper portion of the controlling casing and looking downwardly, the hand driving gear being omitted; Fig. 4 is a longitudinal, vertical, cross-sectional view taken through the center of the controller drum and drum operating means; Fig. 5 is an end view of the stud shaft and head end bearing; and Fig. 6 is a vertical transverse cross-sectional view taken upon the line 6—6 of Fig. 4 and looking in the direction of the arrows.

I have devised my improved controller-operating mechanism particularly for use in a vehicle wherein a generator is driven by an internal combustion engine or other initial power source, the energy derived therefrom being conveyed to suitable motors operatively connected, either directly or by suitable gearing, to the driving wheels of the vehicle, although it will be obvious that so far as the present invention is concerned the source of the electric energy is immaterial, as it may be derived either from a generator or battery carried by the vehicle or may be conveyed thereto by suitable trolley or other lead wires. Likewise the particular construction of the controller and the arrangement of its contacts, brushes, lead wires, resistances, and other elements is entirely a matter of choice and does not concern the present invention. For purposes of disclosure I have illustrated in these drawings a controller of the rotating drum type, said drum being provided with contact plates whereby the motor or motors and resistance or resistances may be connected in different ways so as to cause said motors to operate at various speeds, as will be well understood by those skilled in the art, although controllers of other types could obviously be employed by the modification of the connecting means in mere matters of mechanical detail.

Describing the parts by reference characters, 1 represents generally the body of an automobile, 2 a front wheel, 3 a steering link, 4 the steering wheel and 5 a running board. The steering wheel is secured to the upper end of an inclined shaft 6, the lower end of which is journaled in the steering box 7 and is operatively connected to the steering links 3 in any approved manner. Surrounding this shaft is a sleeve 8 having at its lower end a bevel gear 9 and having at its upper end a lever 10 which may if desired be provided with a grip 11. Surrounding this sleeve is the usual fixed sheath 12 which may, if desired, carry a sector 13 to coöperate with the grip for securing the lever 10 in adjusted position. Meshing with the gear 9 is a bevel pinion 15 secured to the end of a connecting shaft 16 to the other end of which is attached one member 17 of a universal joint. The other member 18 of the universal joint is secured to a short shaft 19 journaled in a bearing 20 carried by a gear box 21 which is secured to the controller casing, and to the inner end of the shaft 19 is attached a bevel gear 22.

The controller casing is indicated at 25 and may conveniently be secured to the frame of the car directly beneath the foot board 26 and inside the skirt 27 of the running board 6, although the location is entirely a matter of design. Likewise the universal joint could be omitted if desired, although its use facilitates the installation of the controller by dispensing with the necessity for exact alinement and prevents binding or cramping of the parts upon the springing or warping of the car frame. Journaled in the end of the controller casing and projecting into the gear box 21 is a stub shaft 28 provided with a bevel pinion 29 meshing with the bevel gear 22. The other end of this stub shaft is provided with a flange 30 formed at one side with a semi-cylindrical wall 31, the ends of which terminate in ears 32, 32. A removable semi-circular clamp member 33 is secured to these ears as shown in Fig. 5 so as to complete the circular socket defined by the wall 31, and coöperates with the wall in securing in place the antifriction bearing 34.

Supported by the bearing 34 is the forward or head end of the drum shaft 36, the rearward end of which is journaled in the bearing 37 carried by the opposite end of the casing 25. Carried by the shaft 36 is the drum 40 having thereon the usual contact plates 41 adapted to be engaged by suitable contact fingers 42 carried by a supporting beam 43. The rearward or foot end of the drum is in this instance provided with resistance coils 44 adapted to be connected in circuit in varying relations as the drum is rotated, in the well known manner. Obviously the particular construction of these coils is not material to the present invention, inasmuch as they might be mounted exteriorly of the controller or even omitted entirely so far as the mode of operating the controller is concerned.

Secured to the head end of the shaft 36 between the drum 40 and the bearing 34 is a spiral spring 46 which is also secured to a pin 47 fixed in an ear 48 projecting from the wall 31. As a result of this construction it will be seen that the setting of the lever 10 will tend to determine the position of the drum 40, although the exact position of the drum may still be varied against the tension of the spring by means such as will now be described.

Secured to the rearward end of the shaft 36 outside of the casing 25 is a bevel pinion 50 with which meshes a toothed segment 51 journaled in a bracket 52 carried by the casing. The segment 51 is also provided with a lever arm 53 to which is articulated a link 54 connected to the lower end of a lever 55 pivoted at 56 and having its upper end projecting through the foot-board 26 and provided with a pedal 57. In the present embodiment the link 54 projects into the casing 25, although this arrangement is not important, and has been chosen merely because of its compactness.

The operation of the mechanism is as follows:—Supposing that it be desired to travel at the rate of fifteen miles an hour, the lever 10 will be set at the position which experience has indicated as corresponding to that speed, or will be moved until that speed has been attained, the pedal 57 being left free to follow the movement of the hand lever. In any case it is preferable so to arrange the gearing that the pedal will be elevated as the lever 10 is moved to increase the speed.

If now it be desired to decrease temporarily the speed of the car, it will be necessary merely to press the pedal 57, thereby rotating the drum rearwardly against the tension of the spring 46. As soon as the exigency which required the decreasing of the speed has passed the pedal may be released, whereupon the drum will retake the position indicated by the lever 10 and the vehicle will regain its former speed.

It is obvious that inasmuch as the present invention is directed broadly toward the means for governing the operation of the controller it is independent of the particular construction of such controller, and that the contact-carrying member thereof may be either cylindrical or otherwise shaped, rotatable, shiftable, or slidable according to the particular type of controller selected, provided only that its position be yieldingly fixed by the manually operated devices and thereafter variable by the pedal connections within the limits fixed by the position of the manually operated devices. While I have necessarily described my invention in detail, I do not, therefore, propose to be limited to such details, except as the same may be positively included in the claims hereto annexed or may be rendered necessary by the prior state of the art.

Having thus described my invention, what I claim is:

1. In a controller, the combination, with a rotatable, contact-carrying drum, of a rotatably mounted actuator therefor, resilient connections between said actuator and said drum whereby said drum will tend to follow but not to precede the movement of said actuator, manually operable means for adjusting said actuator angularly, operating means connected to said drum independently of said actuator, and pedal operated mechanism for actuating said means to vary the position of said drum against the tension of said spring between the limits of the starting and assumed position of said actuator.

2. In a controller, the combination, with a rotatable, contact-carrying drum, of a rotatable actuator therefor mounted coaxially therewith, a spiral spring having one end fixed to said actuator and the other end to said drum whereby said drum will tend to follow but not to precede the movement of said actuator, means for adjusting said actuator angularly, and means connected to said drum independently of said actuator for varying the position of said drum against the tension of said spring between the limits of starting and adjusted position of said actuator.

3. In a controller, the combination with a rotatably mounted actuator, of a bearing carried by said actuator, a rotatable drum having one end journaled in said bearing, means rotatably supporting the opposite end of said drum, said drum and bearing being in axial alinement and rotatable independently of each other, a spring connecting said actuator and drum and tending to cause said drum to follow the movement of said actuator but without preceding such movement, manually adjustable operating means connected to said actuator, and pedal operated means geared to said drum whereby said drum may be shifted between its starting position and the position imparted to it by said manually actuated means.

4. In a self-propelled vehicle, the combination, with a steering shaft, of a rotatable sleeve surrounding said shaft, a handle secured to one end of said sleeve, a controller having a movable contact carrying member, connections between the other end of said sleeve and said movable member, said connections including a resilient element whereby said member will follow yieldingly and not precede the movement of said sleeve, a pedal, and connections between said pedal and said movable member whereby the latter may be shifted to any position between its starting point and the point fixed by the position of said sleeve.

5. In a self-propelled vehicle, the combination, with a steering shaft having a steering wheel at its upper end, of a steering box in which the lower end of said shaft is journaled, a sleeve surrounding said shaft, a handle secured to the upper end of said sleeve adjacent to said steering wheel, a gear secured to said sleeve, a controller having a movable, contact-carrying member, driving connections between said gear and said movable member, said driving connections including a resilient element, a pedal conveniently located with reference to said steering shaft, and connections between said pedal and said movable member whereby the latter may be shifted between its starting position and the position imparted to it by said handle.

6. In a self-propelled vehicle, the combination, with a steering shaft having a steering wheel at its upper end, of a steering box in which the lower end of said shaft is journaled, a rotatable sleeve surrounding said shaft, an adjusting handle secured to said sleeve adjacent to said wheel, a controller having a movable, contact-carrying member, driving connections between said sleeve and said contact carrying member, a fixed sheath surrounding said sleeve, a sector carried by said sheath and coöperating with said handle to maintain the same in adjusted position, a pedal conveniently located relatively to said sheath, and driving connections between said pedal and said movable member whereby the latter may be shifted to any position between the limits set by the starting and adjusted positions of said handle.

7. In a self-propelled vehicle, the combination, with a steering shaft having a steering wheel at its upper end, of a steering box in which the lower end of said shaft is journaled, a rotatable sleeve surrounding said shaft, an adjusting handle secured to said sleeve adjacent to said wheel, a controller having a movable, contact-carrying member, driving connections between said sleeve and said contact carrying member, said driving means including a resilient, energy-storing element, a pedal conveniently located relatively to said shaft, and driving connections between said pedal and said movable member for lifting said pedal as said handle is advanced, whereby a pressure upon said pedal will return said contact-carrying member toward starting position, against the tension of said resilient element and without changing the adjustment of said handle.

8. Means for controlling the transmission of power in a motor vehicle having propelling mechanism including an electrical unit, comprising a controller and hand operated mechanism for normally shifting said controller from and to off position, a spring in said mechanism, a foot controlled mechanism connected with a separate portion of the controller for operating said controller independently of the hand operated mechanism.

In testimony whereof, I hereunto affix my signature in the presence of two witnesses.

WALTER C. BAKER.

Witnesses:
   FRED E. DORN,
   FRED W. JOHNSON.